US006986323B2

(12) United States Patent  (10) Patent No.: US 6,986,323 B2
Ayers  (45) Date of Patent:  Jan. 17, 2006

(54) INLAND AQUACULTURE OF MARINE LIFE USING WATER FROM A SALINE AQUIFER

(75) Inventor: Andrew D. Ayers, Payson, AZ (US)

(73) Assignee: Algal Technologies, Inc., Overgaard, AZ (US)

( * ) Notice: Subject to any disclaimer, the term of this patent is extended or adjusted under 35 U.S.C. 154(b) by 0 days.

(21) Appl. No.: 10/724,014

(22) Filed: Nov. 24, 2003

(65) Prior Publication Data

US 2004/0168648 A1  Sep. 2, 2004

Related U.S. Application Data

(60) Provisional application No. 60/428,859, filed on Nov. 25, 2002.

(51) Int. Cl.
*A01K 61/00*  (2006.01)
(52) U.S. Cl. ....................................................... 119/200
(58) Field of Classification Search ................ 119/200, 119/204, 207, 208, 209, 211, 215, 231, 234, 119/263
See application file for complete search history.

(56) References Cited

U.S. PATENT DOCUMENTS

| | | | | |
|---|---|---|---|---|
| 3,452,966 A | * | 7/1969 | Ludwik | 261/77 |
| 5,732,654 A | * | 3/1998 | Perez et al. | 119/204 |
| 5,961,831 A | * | 10/1999 | Lee et al. | 210/614 |
| 6,382,134 B1 | * | 5/2002 | Gruenberg et al. | 119/215 |
| 6,722,314 B1 | * | 4/2004 | Crisinel et al. | 119/226 |

OTHER PUBLICATIONS

Borowitzka, L. J. at al., Commerical Production of β-Carotene by *Dunaliella Salina* in Open Ponds, *Bulletin of Marine Science*, 47(1):244-252,1990.

Borowitzka, L. L. et al., The Mass Culture of *Dunaliella Salina* for Fine Chemicals: From Laboratory to Pilot Plant, *Hydrobiologia*, 116/117: 1984, Netherlands.

Felder, C.B. et al., High-Value Product Development from Biomass, ASAE/CSAE Meeting Presentation Paper No. 936056, Jun. 20-23, 1993, pp. 1-14.

Lansford, Robert R. et al., Evaluation of Available Saline Water Resources for the Construction of Large-Scale Production Facilities in New Mexico, Abstract 218 New Mexico State University Technical Reports, Dec. 1986, pp. 1-2.

Rebolloso Fuentes, M. M. et al., Outdoor Continuous Culture of *Porphyridium cruentum* in a Tubular Photobioreactor: Quantitative Analysis of the Daily Cyclic Variation of Culture Parameters, *Journal of Biotechnology*, 70, (1999), pp. 271-288.

* cited by examiner

*Primary Examiner*—Yvonne R. Abbott
(74) *Attorney, Agent, or Firm*—Rick Matos; Innovar, L.L.C.

(57) ABSTRACT

A method and system for the inland aquaculture of marine species using water from a saline aquifer having a heavy metals content within the acceptable limits of the EPA guidelines for drinking water. The aquifer is preferably the Coconino aquifer located in Arizona and New Mexico. The system can be used to culture microalgae, macroalgae, fish, shrimp and many other marine species. Nutrients and fertilizers can be added to the water to optimize culture conditions for particular species. Useful products can be isolated from the marine species or the cultured marine species can be harvested as useful products themselves.

40 Claims, 5 Drawing Sheets

EXPLANATION

— 6,200 — — ? PONTENTIOMETRIC CONTOUR — Shows altitude at which water level would stand in a tightly cased well penetrating the C aquifer, 1972-85. Dashed where approximately located; queried where inferred. Contour interval 200 feet. Datum is sea level ━━━━ ━ GENERALIZED BOUNDARY OF THE C AQUIFER — Aquifer extends to the Colorado River in Utah. Dashed where boundary uncertain. Hachures indicate approximate areas where the C aquifer is dry except for perched water.

⬅ GENERALIZED DIRECTION OF FLOW IN THE C AQUIFER

━━━━ ━ GROUND-WATER DIVIDE — Dashed where location is uncertain

INLAND AQUACULTURE OF MARINE LIFE USING WATER FROM A SALINE AQUIFER

This application claims priority from U.S. provisional application Ser. No. 60/428,859; filed Nov. 25, 2002.

FIELD OF THE INVENTION

The present invention concerns the inland aquaculture of marine life. More particularly, the invention relates to a method and system for culturing marine species in ponds, tanks, raceways, bioreactors, photobioreactors, turbidostats, bags or towers using saline water obtained from a saline aquifer, such as the Coconino aquifer located in Arizona and New Mexico.

BACKGROUND OF THE INVENTION

As the demand for food throughout the world increases, a great deal of effort has been expended finding ways to more efficiently produce food, both animal and vegetable, to satisfy the demand. Sea life, including crustaceans and fish, has long been a source of high quality protein for human consumption. However, harvests of wild populations have, in recent years, been severely restricted because of environmental contamination problems and over-fishing. Fish catches have become much smaller and it has been difficult to keep fishing grounds productive. Attempts have been made to grow monocultures of aquatic animals (e.g., shrimp farming) under varying levels of controlled conditions. Often such farms provide a large proportion of a particular kind of seafood consumed. For example, approximately half of the penaeid shrimp consumed in the United States in 1993–94 were from farms. Aquaculture systems of the prior art (mariculture systems for marine organisms) are either open (i.e., water is constantly replenished from an outside source) or closed (i.e., the same water is recirculated through the system).

Successful mariculture has been undertaken mainly in coastal areas using estuarine or coastal waters. Efficient production of crustaceans, fish, and shellfish have been undertaken by surrounding part of a marine area such as a gulf, a bay or an estuary having favorable conditions with nets, or by building ponds on land which take advantage of the tidal flow from the sea or pumping water from the ocean. Large shrimp farms have thus been built in the coastal zones of Latin American and Southeast Asian countries. In the past these shrimp culture systems relied partially on the ecosystems and marine food chains that developed in the rearing ponds to supply the feed for the shrimp. Today, natural foods produced in ponds are supplemented by shrimp feed, and the natural food chains are stimulated by the addition of fertilizer.

A disadvantage to known open mariculture systems, i.e., those systems which rely on natural sea or brine water sources and which are constantly exposed to the environment, is that water quality in estuaries and near shore areas may vary greatly depending upon the nature of the effluents from the land. Herbicides, pesticides, and other agricultural effluents may thus find their way into mariculture systems in affected areas. Similarly, industrial or urban effluents may adversely affect the water quality for such mariculture systems in coastal areas. An example of the deleterious effects of chemical effluents on the culture of marine life is Taura syndrome, which has afflicted the shrimp farming industry in certain tropical locations. Afflicted juvenile shrimp stop feeding, become lethargic, and ultimately die. It appears that the syndrome is caused by high levels of agricultural chemicals in the shrimp culture water, especially fungicides, which are heavily used by agricultural concerns in the affected region. Chemical pollution by agricultural chemicals has also adversely affected shrimp harvests in Latin and South America and Southeast Asia. In addition to mortality due to chemical contaminants, shrimp are susceptible to infection by a variety of viral and bacterial pathogens, such as parvoviruses, baculoviruses, Vibrio, and necrotizing hepatopancreatitis bacterium. Infection with these pathogens result in significantly reduced yields of shrimp. Thus, elimination of the etiological agents of Taura syndrome and infectious diseases of shrimp would be of great utility to the shrimp farming industry in particular, and to the mariculture industry in general.

In light of these problems, there have been attempts to practice mariculture in closed loop systems, by providing a culture environment in a tank installed on land. According to these methods, the problem of environmental contamination can be avoided by isolation of the culture system from natural water sources and by recirculating culture water. The recirculated water is purified by biofiltration, ozonation, foam fractionation, and denitrification to remove pollutants and minimize water exchanges. Several such methods and arrangements for breeding aquatic life in closed systems have been described by the prior art (see U.S. Pat. Nos. 5,076,209 by Kobayashi, et al.; U.S. Pat. No. 4,052,960 by Birkbeck, et al.; U.S. Pat. No. 4,394,846 by Roels; and U.S. Pat. No. 3,973,519 by McCarty, et al.).

Open systems are to date, however, the only systems of sufficient magnitude to support commercially viable operations. The volumes of water necessary for economical mariculture operations can only be obtained from natural water sources, i.e., salt lakes, estuaries, and seas.

U.S. Pat. No. 4,209,943 to Moeller et al. discloses a system for and method of culturing marine algae in a water charged atmosphere, wherein the algae being cultured is not completely immersed in water. Rather, the algae is cultured in a thin film of water containing the required nutrients, while the upper portion of the species is exposed to a high humidity atmosphere containing carbon dioxide.

U.S. Pat. Nos. 4,199,895 and No. 4,115,949 to Avron et al. disclose a process for the simultaneous production of glycerol, carotenes ($\beta$-carotene, its isomers and carotene-like substances) and protein rich material. The process comprises the steps of: cultivating the alga *Dunaliella bardawil* under high-intensity illumination in a growth medium containing a high concentration of sodium chloride (at least 1,5 M in the final stage of the cultivation); providing an adequate supply of carbon, in the form of $CO_2$, in a depth of not exceeding 20 cm of the aqueous medium, in a diurnal cycle of illumination, until algae of high content of the above three components are obtained; and harvesting the algae and recovering from same the three constituents.

U.S. Pat. Nos. 5,947,057 and No. 5,732,654 to Perez et al. disclose a mariculture system and method of culturing marine life with a polluted source water. The system includes a water replenishment reservoir, activated carbon and ozone purification devices, a device for removing toxic byproducts of ozonation of salty or brackish (bromine-containing) water, and ponds for the culture of marine animals. The method includes obtaining water containing compounds and organisms detrimental to marine animal life, treating the water so it is suitable for the culture of marine animals, and raising and harvesting marine animals in the treated water.

U.S. Pat. No. 4,394,846 to Roels discloses a method of utilizing ocean water for the culture of marine species. The method includes maintaining a flow of ocean water through a finfish culture unit and supplying finfish feed to the unit for the culture of finfish therein. The method further includes maintaining a flow of finfish culture unit effluent through a shrimp culture unit and supplying plankton nutrients to that unit for the culture of plankton to constitute part of the feed for the culture of shrimp, and maintaining a flow of shrimp culture unit effluent through a filter feeder unit for the culture of filter feeders therein. The effluent from the filter feeder unit is fed to a seaweed culture unit for the culture of seaweed and clarification of the effluent, after which the clarified effluent is discharged.

U.S. Pat. No. 4,869,017 to Bird et al. discloses a method for the production of macroalgae, e.g., *Gracilaria*, in a marine culture system. Improving the manner in which the aqueous culture medium is created enhances the production. First, the alkalinity of a quantity of freshwater is adjusted by the addition of an alkaline reagent thereto. Then seawater is diluted with alkalinity-adjusted freshwater to create a saline solution having a salinity of between about 15 to 25 parts per thousand and an alkalinity of between about 3 to 10 meq/l. Then, carbon dioxide is dissolved in the resulting solution to bring its pH to between about 7.5 and 8.5. The carbon dioxide enriched solution is then used as the culture medium. Other macroalgae disclosed include *Agardhiella, Porphyra, Gelidium, Pterodadia, Laminaria, Hypnea* and *Chondrus*.

U.S. Pat. No. 6,258,588 to Demetropoulos et al. discloses *Palmaria* cultivars having a growth rate greater than wild type and known strains, particularly when cultured at temperatures greater than about 16° C., and specific embodiments of such cultivars, many of which have a rosette morphology. Methods for isolating such cultivars and using the cultivars as a food source also are described. Isolated *Palmaria* cultivars can be used as a food source for feeding organisms, such as humans.

U.S. Pat. No. 4,417,415 to Cysewski et al. discloses a method of culturing *Porphyridium cruentum* in an enriched seawater using a high initial cell concentration. The seawater is enriched with a soluble nitrate and a soluble phosphate. A hydrophilic colloidal polysaccharide produced by *P. cruentum* is isolated by extraction by making the culture strongly alkaline, and heat-treating it. The culture is then cooled, and acidified and the polysaccharide precipitated by addition of a water-miscible organic solvent such as ethanol. Cysewski et al state that it is not practical to artificially culture macroalgae on the scale necessary for large-scale polysaccharide production, due to their large size and the resultant space required. Accordingly, the macroalgae must be harvested from their natural sites in shallow water near to seacoasts. However, many of the coasts on which the macroalgae occur are rocky and are subject to severe storms at certain times of the year. The growth of the macroalgae in various parts of the United States is hindered by over-harvesting, coastal water pollution, sea urchin infestation and other factors. Moreover, the labor involved in harvesting natural macroalgae is difficult arduous and expensive. Furthermore, the macrolagae may be contaminated by large amounts of foreign matter, such as sand, and require considerable pretreatment to remove such foreign matter before the polysaccharide is extracted from the macroalgae. They state it is difficult to produce a consistent product from macroalgae, and it is necessary to monitor very closely the properties of the polysaccharide, and often to blend polysaccharide from different batches of seaweed, in order to ensure that the thickening properties of the polysaccharide remain constant, since such properties vary not only with the type of seaweed and the site on which it grows, but also with the time of the year.

In view of the difficulties associated with the production of polysaccharides from macroalgae, attempts have been made to extract such polysaccharides from microalgae, several of which are known to exude polysaccharides into the medium surrounding them at various stages during their life cycle (Percival and Foyle, *Carbohydrate Research* (1979) 72, 165–176). U.S. Pat. No. 4,087,936 to Savins et al. and M. L. Anderson, describes a process for the extraction of a polysaccharide from *P. cruentum*. This process is carried out in fermentation vessels using either artificial light or sunlight and the process reportedly can be better controlled than can a process using marine macroalgae. Such processes using microalgae under closely controlled conditions can be expected to yield a much more uniform product than is usually obtained from marine macroalgae.

The cultivation of microalgae to recover biopolymers as well as other products in the algal biomass is well known in the art. Such algae biopolymers are useful in various applications such as thickening agents for mobility control in waterflood oil recovery, as food additives, as flocculants useful in waste water treatment, soil conditioning, and as drilling mud extenders. Cultivation of the algae requires a nutrient medium containing nitrogen and other mineral nutrients and micronutrients, a source of assimilable carbon, illumination with light energy, and favorable conditions of temperature, pH, and salinity. Normally carbon dioxide is employed and this is required in the case of the obligate photoautotrophs that are capable of growth only by photosynthetically incorporating carbon dioxide. However, in the case of algae capable of photoheterotrophic growth, assimilable carbon may be provided by a pre-formed organic carbon source such as glucose, mannose, fructose, either alone or in combination with carbon dioxide.

Zeaxanthin and lutein are xanthophylls that can be extracted from marine algae such as *Dunaliella salina*. Lutein and zeaxanthin find widespread application in the feed additive, neutraceutical, cosmetic, and pharmaceutical industries. They serve important functions for human vision. One major example is the macula, the tiny portion of the retina responsible for 20/20 vision, where lutein and zeaxanthin supplementation slow Age related Macular Degeneration (AMD). Research further indicates that because of its antioxidant properties lutein consumption may play a role in protecting the heart, skin, as well as the breasts and cervix in women. Until now, the only viable source of harvestable lutein was marigold flowers, while no commercially viable process for zeaxanthin production existed Borowitzka et al. (*Bull. Marine Science* (1990), 47(1), 244–252; and *Hydrobiologia* (1984), 116/117, 115–134) disclose a method for the commercial production of β-carotene by *Dunaliella salina* in open-air ponds. A mixture of seawater and freshwater or brine and seawater or brine and freshwater are used as the water source for aquaculture. Additional nutrients are generally also added to the water. The culture conditions are optimized for the production of β-carotene by controlling water salinity, vertical and horizontal distribution of the algal mass, nutrient levels in the water, pond depth, and accumulation of rainwater runoff into the pond.

U.S. Pat. No. 4,581,233 to Herve et al. discloses the isolation of protoexoplasm from algae and the use of the protoexoplasm as a potential therapeutic material. U.S. Pat. No. 4,439,629 to Ruegg discloses the isolation of β-carotene and/or glycerin from *Dunaliella* sp. algae. U.S. Pat. Nos. 4,390,624, No. 4,383,039 and No. 4,383,038 disclose the production of L-proline from *Chlorella* sp. algae. U.S. Pat. No. 4,341,038 to Bloch et al. discloses the isolation of an oil low in sulfur content from *Dunaliella* sp. algae. U.S. Pat. No. 4,913,915 to Tanaka discloses a solid foodstuff made from *Dunaliella* sp. algae. The foodstuff is rich in β-carotene and is nutritious. U.S. Pat. No. 4,851,339 to Hills discloses a process for the isolation of carotenoid, tetrapyrrole and porphyrin by extraction of *Spirulina* sp. or *Dunaliella* sp. algae.

U.S. Pat. No. 2,949,700 to Kathrein discloses a method of obtaining carotenoids and xanthophyll by cultivating *Chlorella vulgaris* and *C. pyrenoidosa* algae in artificial seawater and isolating the carotenoids from the algae.

U.S. Pat. No. 4,780,534 to Lebbar et al. discloses a process for the preparation of agar-agar gel from an extract of red algae *Gelidium sesquipedale*. Agar-agar is a mixture of polysaccharides (agarose, agaropectin) of high molecular weight between 40,000 and 300,000 daltons. It is made generally by producing algae extracts by autoclaving the algae and treating the extracts to remove calcium iron and magnesium ions. The agar is then precipitated at low temperature. The extracts must contain about 2% of agar-agar in order to extract the agar-agar.

U.S. Pat. No. 4,744,996 to Rakow et al. discloses a foodstuff comprising a microalgae embedded in a matrix.

U.S. Pat. No. 4,690,828 to Kitahara et al. discloses a coagulated food made from brown algae. The coagulated food product can be prepared by entirely liquefying with sodium citrate each of the two kinds of brown algae (seaweed), i.e. makombu (*Laminaria japonica*) and wakame, or makombu and hondawara (*Sargassum fulvellum*), into a solution or a viscous liquid, mixing the obtained solutions or viscous liquids, and coagulating the mixture with calcium chloride etc. (see Japanese Patent Laid Open No. 99179/1982). Other suitable brown algae include arame (*Eisenia bicyclis*), kajime (*Ecklonia cava*), hijiki (*Hizikia fusiforme*), hondawara, or a combination of these brown algae and kombu or wakame.

*Spirulina* is a planktonic blue-green algae with an amazing ability to thrive in conditions much too harsh for other algae. It has a highly unusual nutritional profile. *Spirulina* has a 62% amino acid content, is the world's richest natural source of Vitamin B-12 and contains a whole spectrum of natural mixed carotene and xanthophyll phytopigments. *Spirulina* has a soft cell wall made of complex sugars and protein, and is different from most other algae in that it is easily digested. Millions of people worldwide eat *Spirulina* cultivated in scientifically designed algae farms. Current world production of *Spirulina* for human consumption is more than one thousand metric tons annually. The United States leads world production followed by Thailand, India and China. More countries are planning production as they realize it is a valuable strategic resource.

Saline aquifers are known to exist in many parts throughout the United States. However, those aquifers have compositions that are not suitable for aquaculture.

Thus, none of the known art discloses a system for or method of culturing marine species in an open-air system containing water obtained from a saline aquifer such that seawater or brine are not required. Such a system could be operated inland away from the sea. Prior to the present discovery and invention, no suitable inland water source had been identified. A need remains for improved systems for and methods of inland aquaculture of marine species.

SUMMARY OF THE INVENTION

The present invention seeks to overcome some or all of the disadvantages inherent in the art. The present invention provides a system for and method for cultivating/culturing marine species in one or more open-air ponds using water obtained from a saline aquifer. The system does not require seawater or brine from a salt-water lake. The system is used for culturing all types of marine species, such as marine animals and marine plants.

The aquifer is substantially free of toxic heavy metals that are a problem with some natural seawater, brine, estuaries and other aquifers. In other words, the aquifer contains no more than, or preferably less than, the EPA permissible levels of toxic heavy metals for drinking water.

The ionic composition of water obtained from the aquifer is very close to seawater; however, it also contains other ions that one would need to add to natural seawater in order to render the most natural seawater suitable for culturing algae.

Figure 1:
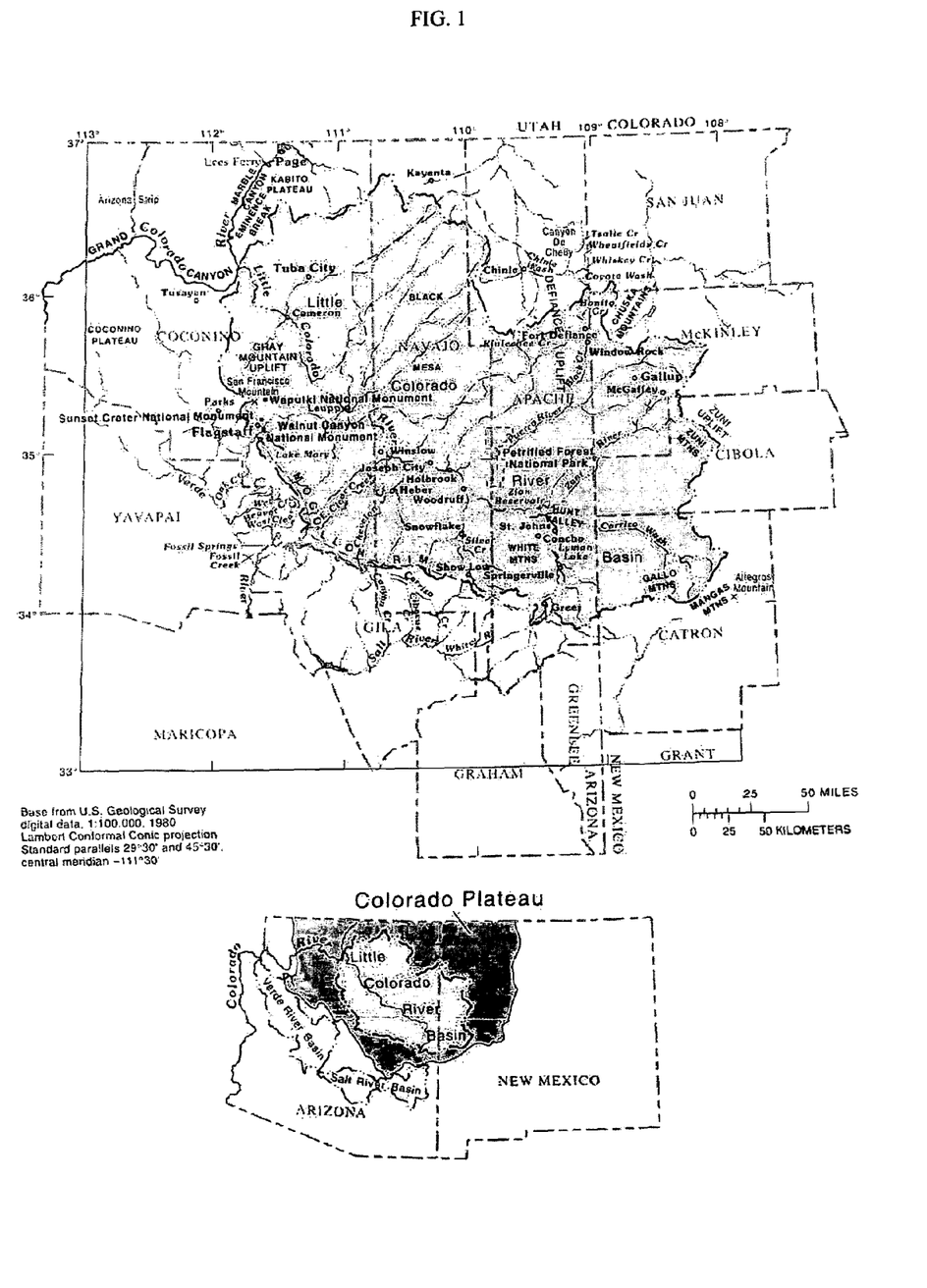
FIGS. 1 and 2 depict Lambert Conformal Conic Projections of the Coconino aquifer.

The Coconino aquifer, from which water is used in the invention, is located in the Little Colorado River Basin and parts of the Verde and Salt River Basins of Colorado and New Mexico (See FIG. 1). The Coconino aquifer is located in the Colorado Plateau. In one specific embodiment, the water from the Coconino aquifer is drawn from a well in the vicinity of Holbrook, Ariz. This area is subject to high solar radiation with an annual average of about 6000–7000 Whr/mi.$^2$/day (See FIG. 2). Moreover, climatic conditions of high heat, low humidity make this land area surrounding and including this aquifer particularly suitable for inland culturing of marine species. In one embodiment, one or more wells of the Coconino aquifer are located in Navajo County, Ariz.

The salinity of the aquifer varies with depth of extraction of water from the aquifer such that one can mix water from two or more different depths of the aquifer to provide water having the desired degree of salinity or ionic composition. In one embodiment, at a depth of about 100 ft., water obtained from a well in the underground aquifer has a salinity of about 1 ppt (part per thousand ), and the salinity of the water increases to about 65 ppt at a depth of about 750 ft. in the well.

Almost any marine plant that itself is a useful foodstuff or from which a useful material can be isolated will be suitable for use in the aquaculture system and method of the invention.

One aspect of the invention provides a method of culturing marine species comprising the steps of:

providing an inland saline aquifer having a composition approximating seawater after aeration and being substantially free of toxic heavy metals and other pollutants;

providing a reservoir to contain saline water from the aquifer, wherein the water has been aerated and allowed to settle to remove excess iron, copper, manganese, zinc and silver;

culturing at least one marine species in a grow out pond using the saline water from the reservoir;

harvesting the at least one marine species or harvesting a useful product extracted from the at least one marine species from the saline water; and purifying said saline water for reuse.

Specific embodiments of the invention include those wherein: 1) the saline aquifer is the Coconino aquifer; 2) the saline aquifer provides saline water having a composition as described herein; 3) at least two different marine species are cultured; 4) the salinity of the water obtained from the aquifer varies according to the depth from which the water was obtained; 5) the aquifer is an underground aquifer from which saline water is obtained by way of one or more wells; 6) the method is adapted to the culturing of microalgae, macroalgae, fish, shrimp and shellfish such as the microalgae *Dunaliella* spp., *Haematococcus* spp., *Porphyridium* spp., *Muriellopsis* spp., *Chlorella* spp., *Chlorococcum* spp., *Tetraselmis* spp., *Spirulina* spp., the macroalgae *Porphyra* spp., *Gracilaria* spp., *Enteromorpha* spp., *Laminaria* spp., *Gelidium* spp., *Chondrus* spp., fish in the families Slamonidae, Bothidae, Pleuronectidae, Soleidae, shrimp in the family penaeidae and the shellfish *Crassostrea* spp., *Ostrea* spp., *Patinopecten* spp., *Argopecten* spp., and *Haliotis* spp.; 8) the method further comprises the step of including one or more fertilizers or nutrients for the marine species in the reservoir; 9) the saline water is obtained from at least two different depths of the aquifer; 10) the method further comprises the step of co-culturing algae and fish, shrimp or shellfish; 11) the useful products are microalgae, macroalgae, fish, shrimp or shellfish; 12) the useful product is a nutritional supplement or nutraceutical; and/or 13) the useful product is bio-diesel, methanol or hydrogen fuel.

Another aspect of the invention provides a system for the aquaculture of marine species, the system comprising:

an inland saline water aquifer that provides saline water having a salt composition approximating the salt composition of seawater at a comparable salinity and having no more than the EPA acceptable levels of heavy metals for drinking water after aeration;

at least one aeration tower to promote the precipitation of excess iron, copper, manganese zinc and silver;

at least one reservoir containing the saline water obtained directly or indirectly from the aquifer;

at least one containment area with the saline water obtained from the reservoir;

a culture of at least one marine species in the saline water;

at least one first processing system for obtaining at least a portion of the culture of the at least one marine species from the saline water to form a useful mass (i.e. an algal paste, a polysaccharide precipitate or a crop of fish, shrimp or crustaceans);

optionally at least one second processing system for preparing the useful mass into a usable form (i.e. a powder, tablet or semi-purified algal paste);

optionally at least one third processing system for extracting at least one useful product from the useful mass.

Specific embodiments of the invention include those wherein: 1) the at least one second processing system is present; 2) the at least one first processing system is adapted for separating a solid from the water; 3) the at least one first processing system is adapted for separating a marine plant from the water; 4) the at least one first processing system is adapted for separating a marine animal from the water; 5) the at least one second processing system is adapted for preparing the marine plant material into a usable form; 6)the at least one third processing system is adapted for extracting a polysaccharide, β-carotene, lutein, astaxanthin, zeaxanthin, docosahexaenoic acid, eicosapentaenoic acid, arachidonic acid, β-phycoerythrin, and/or R-phycocyanin from the useful mass; 7) the at least one third processing system is adapted for processing the algae into bio-diesel, methanol or hydrogen fuel; 8) the system comprises at least two ponds as reservoirs; 9) the at least one first processing system will consist of a constant flow centrifuge or other filtration system which can concentrate unicellular algae in a saline solution with 0.05% w/v solids to 25–50% w/v solids; 10) the at least one second processing system will use stainless steel and polypropylene tanks, mixers, pumps, centrifuges, filters, evaporators, condensers, and other equipment to process the algal mass; 11) the useful mass comprises algae; 12) the containment area is selected from the group consisting of a pond, tank, raceway, bioreactor, photobioreactor, turbidostat, bag system and/or tower system.

Yet another aspect of the invention provides a method of using saline water obtained from the aquifer located at Little Colorado River Valley, the method comprising the step of using the saline water in an inland aquaculture system for at least one marine species.

The invention also provides an open-air inland mariculture system capable of rearing and harvesting aquatic animals and plants in commercial quantities.

BRIEF DESCRIPTION OF THE FIGURES

The following figures form part of the present description and describe exemplary embodiments of the claimed invention. The skilled artisan will, in light of these figures and the description herein, be able to practice the invention without undue experimentation.

DETAILED DESCRIPTION OF THE INVENTION

In one exemplary embodiment, two pumping stations consist of wells drilled to the uppermost and lowermost parts of the aquifer to allow access to both low and high, respectively, concentrations of dissolved salts. Water from these pumping stations is pumped through aeration towers to remove high concentrations of nitrogen gas and add oxygen. Aeration results in the formation of a precipitate of chloride salts, which results in a reduction of iron, copper, manganese zinc and silver content in the water. The aerated water flows into at least two reservoirs where the precipitate settles out. Water is then drawn from these reservoirs by gravity flow or by pumping into a containment area, either one of the greenhouse structures or one of the outdoor ponds. The greenhouse structures contain shallow ponds or a bag culture system for microalgae culture, a macroalgae culture system or tanks for fish, shrimp or shellfish culture. The outdoor ponds if used for microalgae culture can be in the shape of an oval channel with the channel width approximately $\frac{1}{40}^{th}$ of the channel length and with a depth of less than one foot and can be lined with (optionally, white plastic) liners. The cultures are kept in suspension by use of water circulators (such as paddlewheels or pumps), which move the culture around the circular channel. The ponds are harvested by gravity or pumping into the harvest building where the algae are removed from the culture water by a solids separator, such as a centrifuge or filter. The outdoor ponds if used for fish shrimp or shellfish can be of various sizes and shapes depending on the species being cultured. These marine species in these ponds can also be harvested by gravity into a harvest basin and the animals caught in a net while the water is pumped to one of the reuse reservoirs. In the reuse reservoir, the water is disinfected, such as by ozonation, or ultraviolet radiation and then used for microalgae or macroalgae culture to utilize, as fertilizers, the nitrates and phosphates which were excreted into the water by the aquatic animals.

The algal mass isolated from the culture water is optionally further processed by spray drying or by at least one extraction step utilizing organic solvents to remove nutrients such as, but not limited to, polysaccharides, β-carotene, lutein, astaxanthin, zeaxanthin, docosahexaenoic acid, eicosapentaenoic acid, arachidonic acid, β-phycoerythrin, and/or R-phycocyanin.

The algae in the greenhouse bag culture system is harvested by a solid separator, diluted to a specific concentration and packaged, optionally for direct sale.

One embodiment of the aquaculture system for algae employs at least three different subsystems: a) a first subsystem having at least two different greenhouse structures; b) a second subsystem having at least one outdoor grow-out pond; and c) a third subsystem having harvest/extraction equipment. At least one greenhouse structure will be used for a closed continuous culture system. At least one other greenhouse structure will have an intermediate grow out pond within it. Algae obtained from the continuous culture system will be used to inoculate the pond in the other greenhouse. The algae obtained from the pond in the greenhouse will be used to inoculate the outdoor grow-out pond(s). After the algae have matured to the desired stage or after enough algae have grown in the grow-out pond(s), the algae are harvested by gravity into the third subsystem. Useful products are then optionally obtained from the algae, or the algae itself is processed and readied for shipping. Fertilizer(s) (nutrients) for the algae can be added to the saline water at any point prior to the third subsystem.

The conditions under which marine species are cultured can be varied during the life cycle of the species. For example, the initial conditions for culturing algae can favor rapid growth, and the latter conditions can favor optimization of production of one or more target useful products in the algae.

One type of algae suitable in the present invention includes the algae designated as *Dunaliella bardawil* (ATCC 30861, UTEX LB2538), which belongs to the Class of Chlorophycae, Order of Volvocales and which has been deposited in the University of Texas International Culture Collection of Algae, Austin, Tex. 78712, USA. This alga comprises unicellular motile cells of about 15 to 19 μm long and 10 to 14 μm in diameter, which are broadly ovoid or ellipsoid in shape with a fine elastic periplast but with no rigid cell wall. Two flagella 1.5 to 2 times the length of the cell emerge from one edge of the long cell axis, one large chloroplast occupies about half the cell volume and is often arranged in a cup-shape around the nucleus. A single median pyrenoid is embedded in the basal portion of the chloroplast and surrounded by starch granules. The cell volume is 200 to 1000 μm$^3$. The cells reproduce vegetatively by longitudinal division of the motile cells. Optimized conditions of cultivation have been defined Avron et al. (U.S. Pat. Nos. 4,199,895 and No. 4,115,949) and result in the simultaneous production of large quantities of both glycerol and of carotene, providing as byproduct a substance having a high protein content and which can be utilized for various purposes. When grown outdoors under suitably strong illumination the cells are bright orange and have a high carotene content, which can reach values as high as 50 to 90 mg per gram dry weight of algae. When cultivated under suitable conditions the glycerol content can attain values as high as 300 to 400 mg per gram dry weight of algae. The algae must be cultivated under an adequately high intensity of illumination, and this is best carried out outdoors in sunlight. When cultivated outdoors, the depth of the water generally does not to exceed about 15 cm, and the optimum is about 5 cm.

Any macroalgae or microalgae named herein as being adapted for growth in saline water will be suitable for use in the aquaculture system and method of the invention. Exemplary species include, by way of example and without limitation, microalgae such as *Porphyridium cruentum, Spirulina platensis, Cyclotella nana, Dunaliella salina, Dunaliella bardawil, Phaeodactylum tricornutum, Murielopsis* spp., *Chlorella fusca, Chlorella zofingiensis, Chlorella* spp., *Haematococcus pluvialis, Chlorococcum citriforme, Neospongiococcum gelatinosum, Isochrysis galbana, Chlorella stigmataphora, Chlorella vulgaris, Chlorella pyrenoidosa, Chlamydomonas mexicana, Scenedesmus obliquus, Scenedesmus braziliensis, Stichococcus bacillaris, Anabaena flos-aquae, Porphyridium aerugineum, Fragilaria sublinearis, Skeletonema costatum, Pavlova gyrens, Monochrysis lutheri, Coccolithus huxleyi, Nitzschia palea, Dunaliella tertiolecta, Prymnesium paruum* and macroalgae such as *Enteromorpha clathrata, Porphyra tenera, Porphyra* spp., *Enteromorpha* spp., *Laminaria* spp., *Hypnea* spp., *Hizikia fusiforme, Undaria pinnatifida, Eisenia bicyclis, Gracilaria verrucosa, Gracilaria* spp., *Ulva lactuca, Ulva* spp., *Chondrus crispus, Chondrus* spp. and *Gelidium* spp. Algae from the Divisions Chlorophycophyta, Phaeophycophyta, Chrysophycophyta, Cyanophycophyta, Cryptophycophyta, Pyrrhophycophyta and Rhodophycophyta, which are adaptable to saline water as a growth medium, are all suitable for use in the present invention. Genera within these divisions include but are not limited to: Chlorophycophyta —*Chlorella, Carteria, Chlorococcum, Pyramimonas, Nannochloris, Heteromastix, Botrycoccus, Tetraselmis, Ulva, Chlamydomonas, Scenedesmus,* and *Stichococcus;* Phaeophycophyta—*Laminaria, Analipus, Ascophyllum, Chordaria, Dictyopteris, Fucus, Eisenia, Sargassum,* and *Undaria;* Chrysophycophyta—*Isochrysis, Dicrateria, Prymnesium, Chromulina, Olisthodiscus, Cyclotella* and *Chaetoceros;* Cyanophycophyta—*Anabaena, Microcystis, Gomphosphaeria, Nostic, Tolypothrix,* and *Scytonema;* Cryptophycophyta—*Cryptomonas, Hemiselmis, Chroomonas,* and *Rhodomonas;* Pyrrhophycophyta—*Prorocentrum, Peridinium, Gonyaulax* and *Amphidinium;* Rhodophyta—*Porphyridium, Porphyra, Gracilaria, Meristotheca, Gymnogongrus, Eucheuma, Bangia, Gelidium, Chondrus,* and *Ceramium.*

More than one type of marine species can be cultured using the same water from the aquifer of the invention. This type of co-culturing method provides an opportunity for the symbiotic culturing of marine species, optionally wherein the waste of one species serves as a nutrient source for the other marine species. For example, fish being cultured are fed a predetermined feed, and the waste generated by the fish becomes a nutrient source for the algae. The use of artificial fertilizers for algae can be minimized or avoided by co-culturing algae with fish or shrimp. Co-culturing of fish (e.g. salmon) or shrimp can be done with many of the macroalgae. Marine species being co-cultured must be cultured under conditions (i.e. salinity and temperature) that are compatible with those species. In one embodiment, an aquaculture system for co-culturing fish or shrimp with algae comprises a recirculation system where water from a tank containing fish or shrimp is passed through a mechanical filter that removes particulate waste. The filtered water is then used as the culture media for macroalgae. The macroalgae remove the dissolved phosphates, ammonia nitrites and nitrates. This purified water is then returned to the tank containing the fish or shrimp.

The co-culture of algae and a marine animal can be done in a closed water-recirculating system where water from the marine animal culture is passed through a mechanical filter system to remove particulates then through a biological filter. The biological filter contains the bacteria *Nitrosomonas* sp. and *Nitrobacter* sp. that converts most of the ammonia, which was excreted by the marine animal, into nitrites and nitrates. From the biological filter, the water is passed through the algae culture where these fertilizers are used as a nutrient source and then back to the marine animal culture in a purified state.

When culturing shrimp, the water source should have a salinity in the range of 16 to 34 parts per thousand (ppt) as measured by a refractometer or hydrometer. The preferred level of salinity is between 22 and 34 ppt. A particularly preferred salinity level in the system is 28 ppt.

Marine animals suitable that can be cultured in the system of the invention are listed herein. Other marine animals include shrimp, bivalve mollusks, e.g., oysters and clams, herbivorous zooplankton, such as brine shrimp, (*Artemia salina*) and fish. Exemplary fish include of *Oncorhynchus kisutch* (coho salmon), *Paralichthys lethostigma* (southern flounder) and *Hippoglossus hippglossus* (atlantic halibut), the shrimp *Litopenaeus vannamei, Penaeus japonicus, Penaeus orientalis* and *Penaeus monodon* and the shellfish *Crassostrea gigas* (pacific oyster), *Ostrea edulis* (flat oyster), *Patinopecten yessoensis* (deep sea scallop), *Argopecten irradians* (bay scallop), and *Haliotis rufescens* (red abalone). The list above is merely an abbreviated list of the marine animals that can be cultured in the system of the invention. A list of microalgae suitable for use in the present invention is set forth in the CRC Handbook of Microalgal Mass Culture (ed. Amos Richmond, Boca Raton, Fla.: CRC Press, c1986). Other suitable marine algae are all those included in the Culture Collections of Algae worldwide, some of which include: 1) American Type Culture Collection (ATCC), P.O. Box 1549, Manassas, Va. 20108, USA; 2) Culture Collecttion of Algae and Protozoa (CCAP), Scottish Association for Marine Science, Dunstaffnage Marine Laboratory, Dunbeg, OBAN, Argyll PA37 1QA, United Kingdom; 3) Canadian Center for the Culture of Microorganisms, The North East Pacific Culture Collection (NEPCC), Department of Botany, 6270 University Boulevard, Vancouver, B.C. Canada V6T 1Z4; 4) Centro de Investigaciones Biológicas del Noroeste (CIBNOR), S.C., Mar Bermejo No. 195, Col. Playa Palo de Santa Rita, Apdo. Postal 128; La Paz, BCS 23090, México; 5) CSIRO Marine Research (CS), GPO Box 1538, Hobart, Tasmania, 7001, Australia; 6) Provasoli—Guillard National Center for Culture of Marine Phytoplankton (CCMP), McKown Point, West Boothbay Harbor, Me. 04575; 7) UTEX Culture Collection of Algae/MCDB (UTEX), 1 University Station A6700, The University of Texas at Austin, Austin, Tex. 78712-0183, USA.

Exemplary microalgae include *Chaetoceros calcitrans* (CCAP 1010/11, NEPCC 590, CS-178, CCMP 1315), *Chaetoceros muelleri* (CCAP 1010/3, CIBNOR CHM-1, CS-176, CCMP 1316, UTEX LB2658)*Isochrysis galbana* (CCAP 927/1, CIBNOR ISG-1, CS-22, CCMP 1323, UTEX LB987), *Isochrysis* sp. (Tahitian) (CCAP 927/14, CIBNOR IST-1, CS-177, UTEX LB2307), *Nannochloris atomus* (CCAP 251/4B, CS-183, CCMP 508, UTEX LB2164), *Nannochloropsis gaditana* (CCAP 849/5, CCMP 526, UTEX LB2164), *Nannochloropsis oculata* (CCAP 849/1, CIBNOR NNO-1, CS-179, CCMP 525), *Pavlova lutheri* (ATCC 50092, CCAP 931/1, CS-182, CCMP 1325, UTEX LB1293), *Skeletonema costatum* (CCAP 1077/5, NEPCC 755, CS-167, CCMP 1281, UTEX LB2308), *Tetraselmis chui* (CCAP 8/6, NEPCC 482, CS-26, UTEX LB232), *Tetraselmis suecica* (CCAP 66/4, CIBNOR TES-1, CS-187, CCMP 904, UTEX LB2286), *Thalassiosira pseudonana* (CCAP 1085/12, NEPCC 58, CS-173, CCMP 1007), *Dunaliella salina* (ATCC 30861, CCAP 19/30, CS-265, UTEX LB1644), *Dunaliella bardawil* (ATCC 30861, UTEX LB2538), *Porphyridium cruentum* (CIBNOR POC-1, CCMP 1328, UTEX 161) *Chlorella zofingiensis* (CCAP 211/51, UTEX 32), *Chlorococcum citriforme* (UTEX 1769), *Hematococcus pluvialais* (CIBNOR HAP-1, UTEX 2505).

Water with a low salinity is held in a reservoir until needed in grow-out ponds. Replenishment water is needed because, in the open-air system of the present invention, water is lost by evaporation. Water loss will vary from season to season and from geographical area to geographical area. The amount of water required for replenishment will vary, of course, depending on weather (atmospheric) conditions, rainfall and humidity, which can affect evaporation rates. Well water settling ponds and reuse water purification ponds of the invention are cleaned regularly to remove precipitated and sedimented solids. Specifically, the well water settling ponds are cleaned once monthly to yearly by draining into a drying basin and drying the precipitate. The precipitate is collected and sold for the silver within. The reuse water purification ponds are generally cleaned monthly or bi-monthly by draining off the sediment into a drying basin and drying the sediment. The sediment is then used as fertilizer for agricultural crops in the area. Any organic contaminants present in the system can be removed by ozonolysis as described in U.S. Pat. Nos. 5,947,057 and No. 5,732,654 to Perez et al.

The water used in the present invention is obtained from a saline aquifer. The aquifer yields saline water to one or more wells. In one embodiment, the salinity of water obtained from wells of the aquifer varies according to depth of the well, i.e., the depth from which water is taken from the aquifer. In another embodiment, the salinity of the water does not change significantly over a range of depths of the aquifer (well). However, the aquifer is expansive; therefore, wells drilled at different locations, with respect to longitude and/or latitude, of the aquifer can be used. Each well may have its unique elemental profile or it may have an elemental profile similar to another well of the same aquifer. The aquaculture system can employ water from different wells of the same aquifer, a fixed depth single well of the same aquifer and/or a variable depth single well of the same aquifer. Regardless of the combination of wells used to provide the saline water, the water will have an overall elemental profile as indicated below.

At a depth of about 650 feet, one well in the Coconino aquifer provided saline water having the following elemental analysis:

| ION | Method | Concentration (Percentage of Total Ions) |
|---|---|---|
| Chloride* | EPA 300.0 | 52.0 ± 10.0 |
| Sodium* | EPA 4.1.3/200.7 ICP | 37.0 ± 6.0 |
| Hardness (CaCO$_3$)* | SM 2340B | 5.0 ± 0.5 |
| Sulfate* | EPA 300.0 | 2.9 ± 0.5 |
| Calcium* | EPA 200.8 ICP-MS | 1.4 ± 0.5 |
| Total Alkalinity* | EPA 310.1 | 0.79 ± 0.05 |
| Magnesium* | EPA 200.8 ICP-MS | 0.33 ± 0.05 |
| Potassium* | EPA 200.8 ICP-MS | $6.9 \times 10^{-2} \pm 1 \times 10^{-2}$ |

-continued

| ION | Method | Concentration (Percentage of Total Ions) |
|---|---|---|
| Silver+ | EPA 4.1.3/200.7 ICP | $5.2 \times 10^{-2} \pm 5 \times 10^{-3}$ |
| Iron+ | EPA 200.8 ICP-MS | $2.4 \times 10^{-2} \pm 5 \times 10^{-3}$ |
| Strontium* | EPA 200.7 | $1.2 \times 10^{-2} \pm 5 \times 10^{-3}$ |
| Silica (SiO$_2$)* | EPA 200.7 | $8.4 \times 10^{-3} \pm 1 \times 10^{-3}$ |
| Copper+ | EPA 200.8 ICP-MS | $3.9 \times 10^{-3} \pm 5 \times 10^{-4}$ |
| Boron* | EPA 200.7/6010B | $2.3 \times 10^{-3} \pm 5 \times 10^{-4}$ |
| Zinc+ | EPA 200.8 ICP-MS | $1.1 \times 10^{-3} \pm 5 \times 10^{-4}$ |
| Manganese+ | EPA 200.8 ICP-MS | $5.2 \times 10^{-4} \pm 5 \times 10^{-5}$ |
| Nickel | EPA 200.8 ICP-MS | $4.3 \times 10^{-5} \pm 5 \times 10^{-6}$ |
| Lead | EPA 200.8 ICP-MS | $1.8 \times 10^{-5} \pm 5 \times 10^{-6}$ |
| Bromine* | EPA 300.0 | $\leq 8.2 \times 10^{-4}$ |
| Fluoride | EPA 300.0 | $\leq 8.2 \times 10^{-4}$ |
| Aluminum | EPA 200.8 ICP-MS | $\leq 1.6 \times 10^{-5}$ |
| Phosphorous | SM 4500-P-B, D | $\leq 1.6 \times 10^{-5}$ |
| Cyanide | EPA 335.2 | $<1.6 \times 10^{-5}$ |
| Arsenic | EPA 200.8 ICP-MS | $<1.7 \times 10^{-6}$ |
| Cadmium | EPA 200.8 ICP-MS | $\leq 1.7 \times 10^{-6}$ |
| Selenium | EPA 200.8 ICP-MS | $\leq 1.7 \times 10^{-6}$ |
| Mercury | EPA 245.1 CVAA | $<3.0 \times 10^{-7}$ |

The more important ions included above are denoted with an asterisk (*). The ions that are found at concentrations above what is found in natural seawater are denoted with a "+".

At a depth of about 100 feet the water in two wells in the saline, central part of the Coconino aquifer, had an average elemental analysis as follows:

| ION | Method | Concentration (Percentage of Total Ions) |
|---|---|---|
| Chloride | EPA 300.0 | $14.0 \pm 5.0$ |
| Sodium | EPA 4.1.3/200.7 ICP | $35.0 \pm 5.0$ |
| Sulfate | EPA 300.0 | $21 \pm 2.0$ |
| Calcium | EPA 200.8 ICP-MS | $2.0 \pm 1.0$ |
| Silica (SiO$_2$) | EPA 200.7 | $1.4 \pm 1.0$ |
| Magnesium | EPA 200.8 ICP-MS | $0.55 \pm 0.20$ |

The saline water provided by the aquifer meets the EPA Ground and Drinking water standards for heavy metals content (see below) and is not contaminated with harmful amounts of fungicide, herbicide or pesticide. In other words, the saline water from the aquifer includes no more than the amounts indicated for each metal in the table below.

| EPA Ground Water Drinking Water Standards | |
|---|---|
| Metal | Permissible Upper limit (mg/l) |
| Antimony | 0.006 |
| Arsenic | 0.01 |
| Barium | 2.0 |
| Beryllium | 0.004 |
| Cadmium | 0.005 |
| Chromium | 0.1 |
| Cyanide (free) | 0.2 |
| Fluoride | 4.0 |
| Lead | 0.015 |
| Mercury | 0.002 |
| Selenium | 0.05 |
| Thallium | 0.0005 |

In general, water obtained from the Coconino aquifer will be suitable for use for the present invention if it has an elemental analysis as detailed below.

| ION | Concentration (Percentage of Total Ions) |
|---|---|
| Chloride* | $9-62 \pm 5$ |
| Sodium* | $30-43 \pm 3$ |
| Sulfate* | 2.4–23 |
| Calcium* | $0.9-3.0 \pm 0.5$ |
| Magnesium* | $0.28-0.75 \pm 0.1$ |
| Silica (SiO$_2$)* | $7 \times 10^{-3} - 2.4$ |
| One or more other metal ions | To 100% |

The amounts indicated above may be different for saline water obtained from different locations and/or depths of the Coconino aquifer. Water composition changes according to depth and location from which it is drawn, since the composition of the ground surrounding the position from which it is drawn changes with the location or depth of a well used to obtain the saline water.

In addition, saline water obtained from the aquifer can contain amounts of phosphorous, aluminum, fluoride, nickel, zinc, manganese, silver, iron, calcium carbonate, potassium, strontium, boron, bromine, copper or a combination thereof. One or more those metals can be included in an amount useful for making the saline water suitable for aquaculture of a marine species.

It is well known that different marine species require specific nutrients in their media in order to propagate. The composition of the saline water can be modified to render it more suitable for aquaculture of a particular marine species. In other words, the media composition can be varied according to the marine species being cultured. Nutrients typically used to culture algae include the ions $NH_4$, $NO_3$, $PO_4$, K, $SiO_3$, Zn, Mn, Mo, Co, Cu, Fe, EDTA, and the vitamins cyanocobalamin, biotin, and thiamine hydrochloride. For example, the algae *Dunaliella bardawil*, needs the nutrients K, Fe, $NO_3$, $NH_4$, and $PO_4$ added to the seawater for optimal growth. *Porphyridium cruentum* also needs K, Fe, $NO_3$, $NH_4$, and $PO_4$ plus the nutrients Zn, B, Co, Cu, Mn, and Mo. A number of different useful products can be isolated from macroalgae and microalgae. For example, the macroalgae cultured and harvested according to the present invention is further treated according to known methods for the isolation of alginic acid, agar, carrageenan, protein, polysaccharides (i.e. Laminaran), tetrapyrrole, porphyrin, antibiotics, bromophenols, terpenes, toxins, and others [1,2]. Microalgae in addition to some of the above components also contain β-carotene, lutein, astaxanthin, zeaxanthin, cryptoxanthin glycerol, fluorescent detection agents (R-Phycocyanin and β-Phycoerythrin ), essential fatty acids such as docosahexaenoic acid, eicosapentaenoic acid, and arachidonic acid and many other compounds. Accordingly, the invention includes the optional addition of nutrients and/or fertilizers to the saline water in order to render its composition suitable for use in culturing specific marine species.

Additional information regarding the harvesting of useful products that can be obtained from the marine species cultured is disclosed in Hoppe, Heins A., Levring, T., and Tanaka, Y., ed., (1979). *Mairine Algae in Pharmaceutical Science*. Berlin, N.Y. :de Gruyter; Pharmaceutical Uses of Seaweeds. Presented in the Proceedngs of 9th International Seaweed Symposium. Santa Barbara, Calif. Arne Jensen and Janet R. Stein, Editors. Published by Science Press as supplement to *Botanica Marina*. 1977; Arasaki, Seibin, and Arasaki, Teruko, (1983). *Vegetables From the Sea*. Japan Publications, Inc.; Borowitzka, Michael A. and Borowitzka, Lesley J., editors (1988) *Micro-Algal Biotechnology*. Cambridge University Press, Cambridge; Richmond, Amos, CRC *Handbook of Microalgal Mass Culture*, CRC Press, Inc., Boca Raton, Fla.; and De La Noue, Joel, and De Pauw, Niels, (1988) The Potential of Microalgal Biotechnology: A Review of Production and Uses of Microalgae. Biotech. Adv. Vol. 6, pp 725–770, the disclosures of which are hereby incorporated by reference.

Salt is a byproduct of the process due to its accumulation in the evaporation ponds. It is a useful product that can be harvested and sold or recycled in the process of the invention.

Natural mixed carotenoids can be isolated from the sea algae *Dunaliella bordawil* using standard extraction procedures known in the art with polar organic solvents. Mixed carotenoids have a multitude of applications that can be classified into the following categories: 1) use within the vitamin industry as an antioxidant; 2) a natural food coloring agent; 3) colorant in cosmetics and skin care products; 4) colorant and nutritional supplement for pet foods; 5) dietary food and nutritional supplement for livestock, and in the aquaculture industry for shrimp, fish and prawn farms. The total carotenoid content of the mixed carotenoids is composed of five naturally occurring carotenoids that are commonly found in various fruits, cruciferous, yellow, and dark green leafy vegetables. The typical carotenoid distribution is as follows: β-Carotene (96%), α-Carotene (3.0%), cryptoxanthin (0.5%), zeaxanthin (0.2%), and lutein (0.3%).

Hydrophilic colloidal polysaccharides, such as agar, alginic acid, and carrageenan, can be extracted from marine macroalgae. Agar and carrageenan are extracted by hot water and subsequent precipitation, while alginic acid is extracted by acid washing, alkali dissolution and salt precipitation. These polysaccharides are useful as thickeners, gelling agents, emulsion stabilizers, suspending agents, emollients and demulcents and are used in large quantities in the food, cosmetics and pharmaceutical industries. Polysaccharides are also used in the oil industry as thickeners in drilling muds and in fluids used for the tertiary recovery of oil from underground strata.

The macroalgae *Gelidium* sp. can be cultured as a source for alginates. The macroalgae *Gracilaria* sp. (ogo) and *Porphyra* sp. (nori) can be cultured for sale as food. Gracilaria is used raw in salads and other dishes while Porphyra is generally dried in a sheet form and used in various ways. These macroalgae are particularly useful for co-culturing with fish or shrimp, since water from the macroalgae culture can be used directly without filtration for culturing fish or shrimp.

Methods for isolation of these useful materials are detailed in references cited herein in particular, U.S. Pat. Nos. 4,417,415, No. 6,258,588, No. 4,869,017, No. 4,394,846, No. 5,947,057, No. 5,732,654, No. 4,199,895, No. 4,115,949, No. 4,209,943, No. 4,581,233, No. 4,439,629, No. 4,390,624, No. 4,383,039, No. 4,383,038, No. 4,341,038, No. 4,780,534, No. 4,744,996, No. 4,690,828, No. 4,913,915, and 4,851,339, the entire disclosures of which are hereby incorporated by reference.

The useful products yielded by the growth and harvesting of the alga *Dunaliella* are detailed in a publication by Williams et al. (BIOTECHNOLOGY IN ENERGY PRODUCTION AND CONSERVATION published by John Wiley & Sons, New York, 1979, article entitled "Solar Bioconversion Systems Based on Algal Glycerol Production"), the entire disclosure of which is hereby incorporated by reference.

In addition, marine animals such as fish, shrimp, mollusks, and shellfish, can be harvested and sold as food or as a raw material for isolating other useful products.

The red algae *Porphyridium cruentum* can be cultured as a source of eicosapentaenoic acid, arachidonic acid, β-phycoerythrin and carrageenan. Methods for isolation of these useful materials are detailed in references cited herein in particular articles by Guil-Guerrero et al. (EICOSAPENTAENOIC AND ARACHIDONIC ACIDS PURIFICATION FROM THE RED MICROALGA *Porphyridium cruentum*. Bioseparation 9: 299–306, 2001) and by Fabregas et al. (MIXOTROPHIC PRODUCTION OF PHYCOERYTHRIN AND EXOPOLYSACCHARID BY THE MICROALGAE *Porphyridium cruentum*. Cryptogamie, Algol., 20 (2): 89–94, 1999) the entire disclosures of which are hereby incorporated by reference.

The microalgae *Tetraselmis* sp. can be cultured in the present system and utilized as a concentrated liquid microalgae feed for larval fish, shrimp, and bivalve shellfish. It can be used to supplement or replace live algae grown on-site at fish and shrimp hatcheries. *Tetraselmis* concentrate is a live algae product but with most of the water removed and without significant amounts or with no bacteria and other contaminates that would hinder hatchery productivity.

Astaxanthin is a useful product extracted from the microalgae *Haematococcus pluvialis*, which is believed to be the marine organism capable of accumulating the highest levels of astaxanthin in nature. Astaxanthin is a carotenoid pigment found in nature in fish and crustacea. It is a potent antioxidant and appears to have antibacterial and anti-tumor activities that may be related to enhancing the effectiveness of the immune system. Astaxanthin can be used as a nutraceutical or in pharmaceutical products. Methods for isolation of Astaxanthin are detailed in references cited herein in particular, U.S. Pat. Nos. 6,022,701 and No. 4,871,551 and articles by Fabregas et al. (TWO-STAGE CULTURE FOR THE PRODUCTION OF ASTAXANTHIN FROM *Haematococcus pluvialis*. Journal of Biotechnology 89: 65–71, 2001) and Miguel Olaizola (COMMERCIAL PRODUCTION OF ASTAXANTHIN FROM *Haematococcus pluvialis* USING 25,000-LITER OUTDOOR PHOTOBIOREACTORS. Journal of Applied Phycology 12:499–506, 2000) the entire disclosures of which are hereby incorporated by reference.

Figure 2:
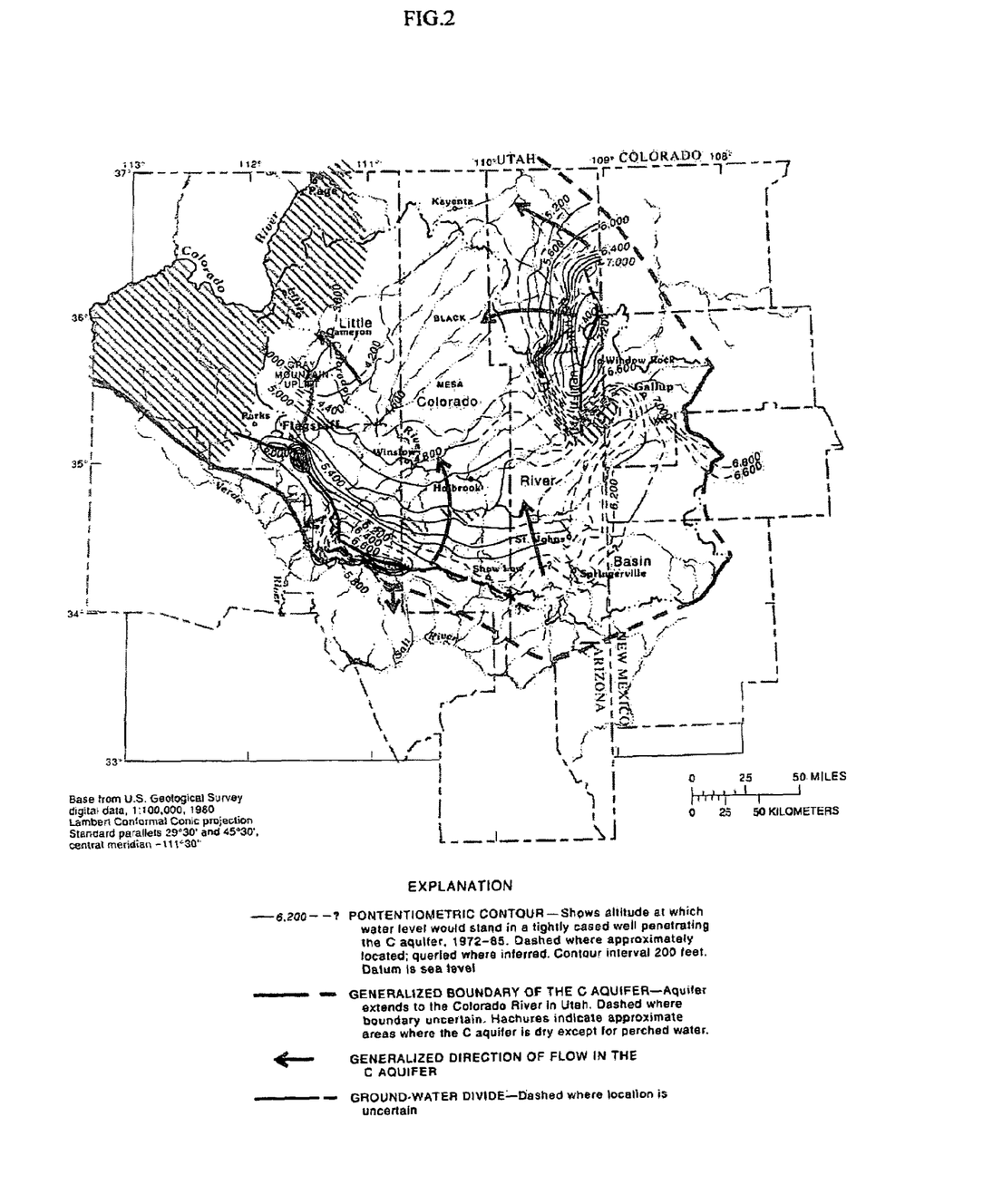

As detailed in this USGS report by Hart et. Al (2002) the generally accepted boundaries of the Coconino aquifer are depicted in FIG. 1. The lateral extent of the Coconino aquifer generally conforms to the surface-water drainage of the Little Colorado River Basin (FIG. 2). The aquifer extends beyond the southern boundary of the basin into the Verde and Salt River Basins, conforming to the outcrops of Pennsylvanian and Permian age rocks, and beyond the north-northwestern boundary of the basin into Utah (FIG. 2). In the northeastern part of the study area, the Coconino aquifer is about 400 to 600 ft thick and thins eastward into New Mexico (Cooley and others, 1969). Paleozoic rocks are relatively unexplored eastward into New Mexico, and ground-water level data are basically nonexistent for areas southeast of Gallup, N. Mex.; therefore, the boundary of the Coconino aquifer is uncertain in these locations. West of the Little Colorado River Basin (FIG. 9), the Coconino aquifer is dry except for isolated areas of perched water (McGavock and others, 1986). Ground-water levels in existing wells that discharge water from the Coconino aquifer range from more than 1,000 ft below land surface near Flagstaff to above land surface near the Little Colorado River roughly between St. Johns and Joseph City.

Cooley and others (1969) defined the Coconino multiple-aquifer system (Coconino aquifer) as the sequence between the top of the Kaibab Formation (and, in some places, the Shinarump Member of the Chinle Formation and the Moenkopi Formation) and the upper part of the Supai Formation. The Coconino Sandstone and its lateral equivalents-the Glorieta Sandstone, De Chelly Sandstone, and the De Chelly Sandstone Member of the Cutler Formation-are the main water- bearing units of the Coconino aquifer throughout most of the Little Colorado River Basin and are connected hydraulically. Near Flagstaff and eastward toward Heber, the Schnebley Hill Formation is a major part of the Coconino aquifer.

The Shinarump Member of the Chinle Formation ranges in thickness from 850 to 1,500 ft in the Black Mesa area, and the Kaibab Formation is more than 400 ft thick in the lower Little Colorado River area. The Coconino Sandstone is continuous in the subsurface across the Little Colorado River Basin except in the Defiance Uplift. The formation ranges in thickness from about 60 ft in the northern part of the basin to 900 ft north of Flagstaff. The Glorieta Sandstone is about 300 ft thick near the Zuni Mountains, and the De Chelly Sandstone near the Defiance Uplift ranges in thickness from about 300 to 800 ft.

The Supai Group has not been well defined in the basin, but recent work by Blakey and Knepp (1989) has resulted in the reclassification of some rocks assigned to the Supai Group. The thickness of the Supai Group in the basin ranges from 1,100 ft in the Defiance Uplift area to 2,000 ft near the mouth of the Little Colorado River (Irwin and others, 1971). Blakey (1990) reclassified the units of the Supai Group in the southern part of the basin as the Schnebly Hill Formation. The Schnebly Hill Formation varies in thickness from a few feet near Williams and the Defiance Uplift to as much as 1,700 ft in the interior of the basin near Holbrook. Additional disclosure regarding the characterization of this aquifer can be found in Hart, R. J., Ward J. J., Bills, D. J., and Flynn M. E., 2002, Generalized Hydrogeology and Ground-Water Budget for the Coconino Aquifer, Little Colorado River Basin and Parts of the Verde and Salt River Basins, Arizona and New Mexico. U.S. Geological Survey Water-Resources Investigations Report 02-4026; Blakey, R. C., 1990, Stratigraphy and geologic history of Pennsylvanian and Permian rocks, Mogollon Rim region, central Arizona and vicinity: Geological Society of America Bulletin, v. 102, no. 9, p.1189–1217; Blakey, R. C., and Knepp, R., 1989, Pennsylvanian and Permian geology of Arizona, in Jenney, J. P., and Reynolds, S. J., eds., Geologic Evolution of Arizona: Arizona Geological Society Digest 17, p. 313–347; Cooley, M. E., Harshbarger, J. W., Akers, J. P., and Hardt, W. F., 1969, Regional hydrogeology of the Navajo and Hopi Indian Reservations, Arizona, New Mexico, and Utah, with a section on Vegetation by O. N. Hicks: U.S. Geological Survey Professional Paper 521-A, 61 p.; Irwin, J. H., Steven, P. R., and Cooley, M. E., 1971, Geology of the Paleozoic rocks, Navajo and Hopi Indian Reservations, Arizona, New Mexico, and Utah: U.S. Geological Survey Professional Paper 521-C, 32 p.; McGavock, E. H., Anderson, T. W., Moosburner, Otto, and Mann, L. J., 1986, Water resources of southern Coconino County, Arizona: Arizona Department of Water Resources Bulletin 4, 53 p.

Figure 4:
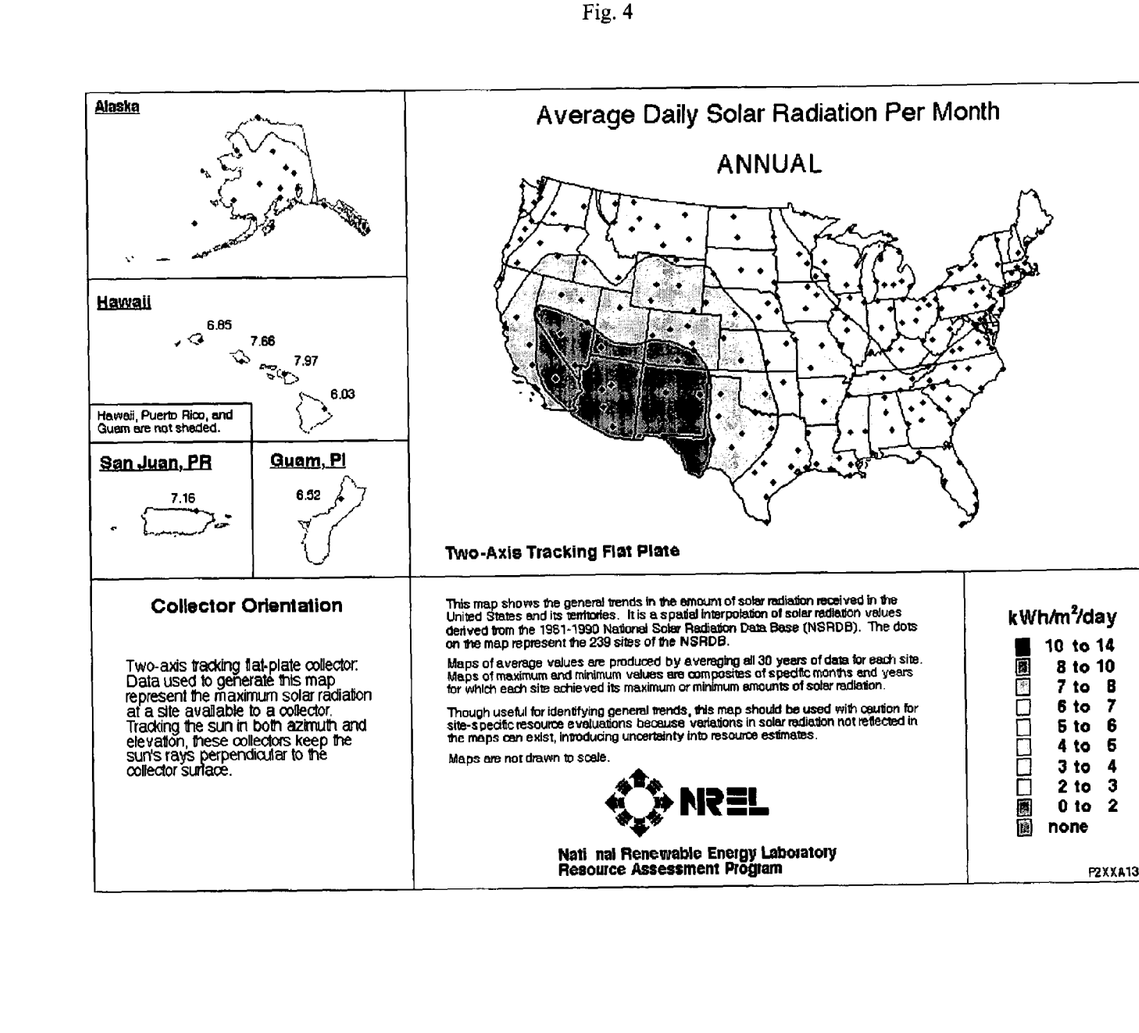
FIG. 4 depicts a map indicating the amount of solar radiation received in the United States on a daily basis.

The Coconino aquifer is located in an area that receives high solar radiation. Such an area is particularly suitable for culturing marine species. FIG. 4 depicts a map of the solar radiation that the United States received on a daily basis using a 2-axis tracking flat-plate collector. The area in which the Coconino aquifer is located receives approximately 8,800 $Wh/m^2/day$. This amount of radiation is higher than in almost any other area in the United States. In fact it is higher than that received in Honolulu, Hi., which receives approximately 7,700 $Wh/m^2/day$. This is important because algae productions rates are directly correlated with the amount of solar radiation available for photosynthesis.

Figure 3:
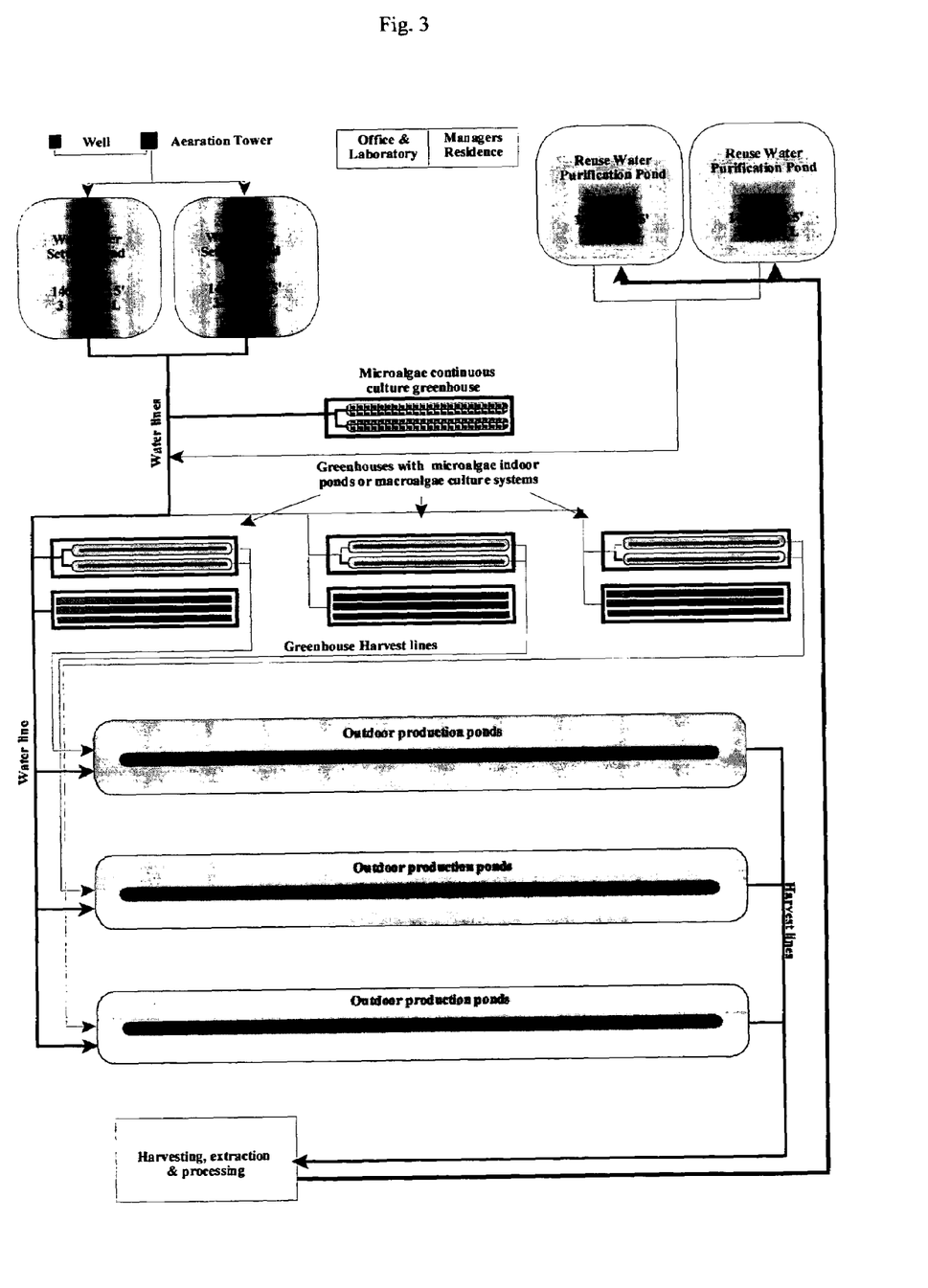
FIG. 3 depicts a top plan view of an exemplary embodiment of the algal culture system of the invention.

An exemplary layout of the site-plan for the algal culture system of the invention is depicted in FIG. 3. Saline water obtained from a well is aerated in an aeration tower and conveyed on to one or more settling ponds in which sedimentation of solids, such as chloride-containing precipitates) occurs to form clarified saline water. The clarified saline water is provided to one or more continuous culture greenhouses, one or more greenhouses with indoor ponds, or macroalgae culture systems, or one or more outdoor production ponds. The water containing the cultured algae is then conducted to harvesting, extraction and/or processing equipment. The water is then pumped into one or more purification ponds, which can serve as a containment area for purification and disinfection of the reuse water.

Figure 5:
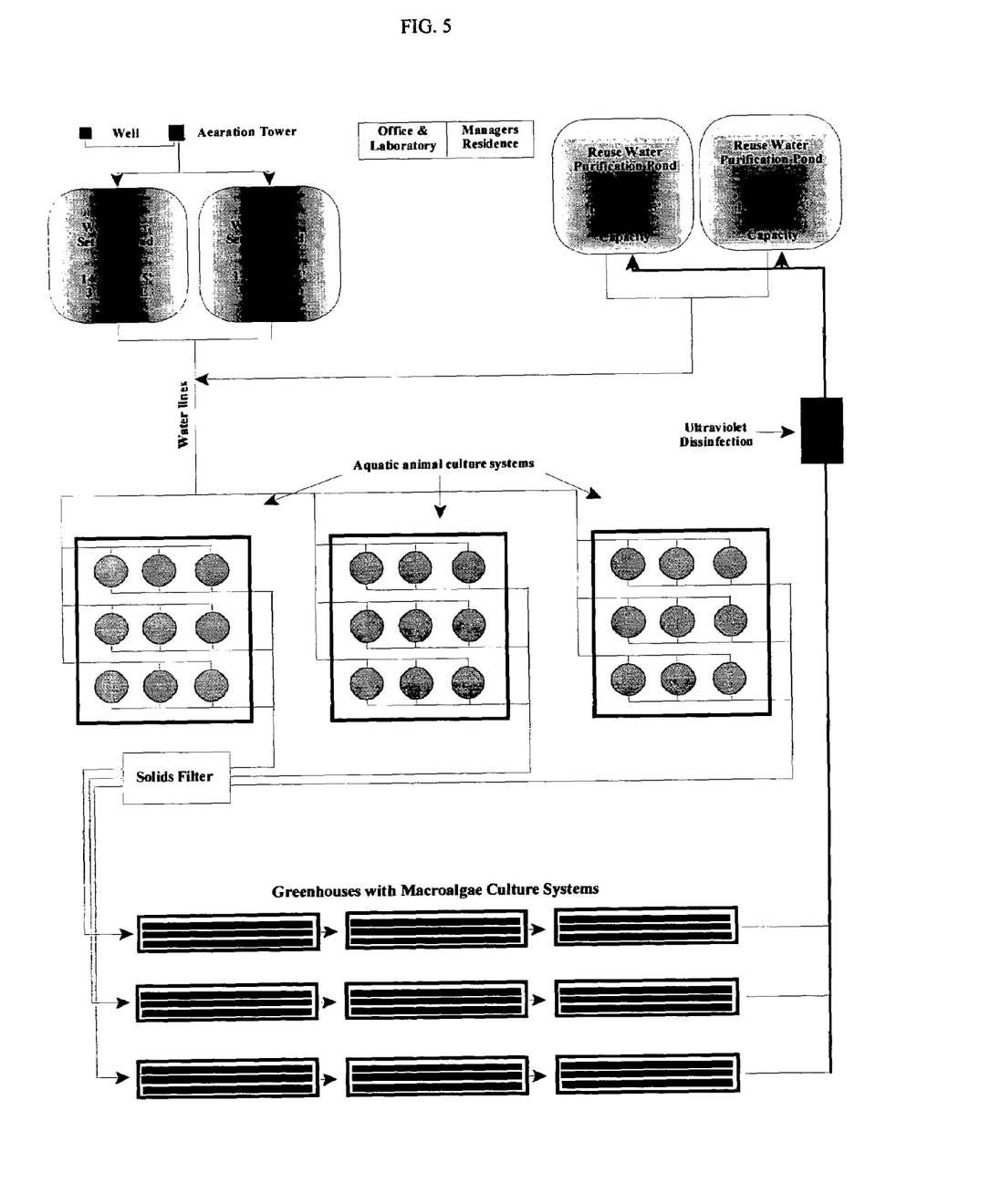
FIG. 5 depicts a top plan view of an exemplary embodiment of the aquatic animal culture system of the invention.

Another exemplary layout of the site-plan for the aquatic animal culture system of the invention is depicted in FIG. 5. Saline water obtained from a well is aerated in an aeration tower and conveyed on to one or more settling ponds in which sedimentation of solids, such as chloride-containing precipitates) occurs to form clarified saline water. The clarified saline water is provided to one or more aquatic animal culture systems. After being used to culture aquatic animals the water containing animal waste products is filtered to remove suspended solids and then used as culture water for a series of macroalgae culture systems. After being used as a culture media for macroalgae the semi-purified water is disinfected by ultraviolet radiation and stored in reuse ponds prior to use again as a culture media for aquatic animals. When mature the aquatic animals and macroalgae are harvested processed if necessary and sold.

In the continuous culture greenhouse, microalgae are grown in closed recirculating axenic systems. Cultures are harvested on a continuous or semicontinuous basis from these systems. These cultures can then be processed and packaged for sale or can be used for the inoculation of one or more of the indoor microalgae ponds. Macroalgae are cultured in a system within one or more of the greenhouses using a macroalgae culture system as described in U.S. Pat. No. 4,209,943 by Moeller, et al or by some other macroalgae culture system. Greenhouses with indoor ponds are inoculated from continuous cultures of microalgae and are allowed to grow. Once the algae have reached a desired stage of development and growth the culture is either harvested, processed and packaged for sale or is used as an inoculum for the outdoor grow-out ponds. Microalgae in the outdoor production ponds (grow-out ponds) are grown to maturity before harvesting. Harvesting of the algae is then done by conveying the water containing the algae to the processing area, wherein all or a major portion of the water and algae are separated. The algae are then subjected to conventional extraction processes or they are cleaned, dried, and packaged for sale. The extraction process is conducted generally according to conventional processes known in the art or as described below.

While it is generally not necessary, fresh (non-saline) water can be added to the saline water at any point throughout the process. For example, the non-saline water can be added to adjust the salinity of the saline water to maintain acceptable levels. Likewise, non-saline water can be added to wash useful materials being processed according to the invention.

In view of the above description and the examples below, one of ordinary skill in the art will be able to practice the invention as claimed without undue experimentation. The foregoing will be better understood with reference to the following examples that detail certain procedures for the culture of marine species using the process and system according to the present invention. All references made to these examples are for the purposes of illustration. The following examples should not be considered exhaustive, but merely illustrative of only a few of the many embodiments contemplated by the present invention.

EXAMPLE 1

The following process can be used to culture the microalgae *Dunaliella bardawil*. The algae are kept in continuous culture in a closed system containing filtered saltwater from the Coconino aquifer with a NaCl content of at least 1.5 M, which is fertilized with 1–500 mM and preferably 4 mM; $K^+$, 0.15 mM $PO_4^{3-}$, 4 mM $NO_3^-$, and 30 µM EDTA. pH is maintained by injection of $CO_2$. 90% of this culture is harvested and used as an inoculum for a shallow (20–25 cm depth) pond within a greenhouse. The pond volume is 10 times the volume of the inoculum and is fertilized with the same concentration of fertilizers shown above. The illumination within the greenhouse is maintained at a level to maximize growth. Prior to the algae reaching stationary growth phase the pond contents are used as an inoculum for a shallow (25–30 cm) outdoor pond with a volume 10 times the volume of the inoculum. The outdoor pond is fertilized with the same concentration of fertilizers shown above and allowed to grow to stationary phase. At this point the fertilizer $NO_3^-$ has been exhausted which causes the algae to accumulate β-Carotene under high illumination. When the maximum amount of β-Carotene has been accumulated the algae are harvested by centrifugation and the Carotenoids and glycerol are extracted and purified using Class III solvents as detailed in the Department of Health and Human Services, Food and Drug Administration (FDA) in Docket No. 97D-0148 published in Federal Register: May 2, 1997 (volume 62, Number 85, pages 24301–24309).

EXAMPLE 2

The following process can be used to culture the macroalgae *Gracilaria verrucosa*. In this process water from the Coconino aquifer, with a NaCl content of approximately 500 mM, is fertilized with the fertilizers $NO_3^-$, $NH_4^+$, $PO_4^{3-}$ and $K^+$. This water is conveyed to a tank where it is stored until it is needed. The algae are attached to translucent pieces of plastic mesh and placed on a rack system. Nutrient media is sprayed over the algae in predetermined intervals. Excess water is collected beneath the algae, filtered, and returned to the storage tank. The nutrient media is checked periodically for concentrations of the various fertilizers. When a significant amount of growth is achieved the algae is harvested and packaged.

EXAMPLE 3

The following process can be used to co-culture *Haliotis fulgens* (green abalone) and *Gracilaria parvispora* (Ogo). This process is particularly useful in that the waste created by *Haliotis fulgens* is used as a nutrient source by *Gracilaria parvispora*. In this system water is continuously circulated between the algae culture facility and the abalone culture facility. Abalone are cultured in raceways that are about three feet wide, eight feet long and one and one half feet deep. The juveniles (3 to 5 mm) are placed into the raceways at a density of approximately 5000 per tank. They are fed the macroalgae *Egregia*, *Ulva* and *Gracilaria*. Water flow is about 10 to 50 L/min and the temperature is maintained at 21–25° C. The water from the abalone culture tank containing excreted $NH_4^+$ is passed through a rotating screen filter and a UV sterilizer to a holding tank. Water in the holding tank is monitored for $NO_3^-$, $NH_4^+$, $PO_4^{3-}$ and $K^+$ concentrations and additions of $NO_3^-$, $PO_4^{3-}$ and $K^+$ are made to keep the levels at that needed for *Gracilaria* culture. The *Gracilaria* cultures are attached to translucent pieces of plastic mesh and placed on a rack system. Nutrient media is sprayed over the algae at predetermined intervals. Runoff water is collected from beneath the algae, filtered, and returned to the abalone culture tanks. The *Gracilaria* remove the $NH_4^+$ from the water and utilize it as a nitrogen source, which decreases the amount of $NO_3^-$ needed in the culture media. Feed material for the *Haliotis fulgens* can be added to the reservoir.

EXAMPLE 4

The water obtained from the Coconino aquifer can be modified to specific compositions according to the marine species to be cultured. The following exemplary formulations are prepared as indicated and used to culture the specified marine species.

A. Formulation for Culturing *Haematococcus pluvialis*. To each liter of water from the Coconino aquifer which has a salinity of 1 ppt total dissolved salts add the following fertilizers and nutrients.

| | |
|---|---|
| $NaNO_3$ | 25.66 mM |
| $K_2HPO_4$ | 5.47 mM |
| $MgSO_4.7H_2O$ | 3.4 mM |
| $CaCl_2.2H_2O$ | 0.2 mM |
| Citric Acid | 0.1 mM |
| Feric citrate.H2O | 0.1 mM |
| EDTA | 17.1 µM |
| $Na_2CO_3$ | 1.5 mM |
| $H_3BO_3$ | 47.0 µM |
| $MnCl_2.4H_2O$ | 30.97 µM |
| $ZnSO4.7H_2O$ | 3.8 µM |
| $Na_2MoO_4.2H_2O$ | 6.67 µM |
| $CuSO_4.5H_2O$ | 1.35 µM |
| $CoCl_2.6H_2O$ | 0.84 µM |

B. Formulation for Culturing *Tetraselmis suecica*. To each liter of water from the Coconino aquifer which has a salinity of 35 ppt total dissolved salts add the following nutrients:

| | |
|---|---|
| $NaNO_3$ | 0.88 mM |
| $NaH_2PO_4.H_2O$ | 36.50 µM |
| $MgSO_4.7H_2O$ | 15.34 mM |
| $MgCl_2.6H_2O$ | 32.46 mM |
| KCl | 9.26 mM |
| KBr | 0.84 mM |
| $H_3BO_3$ | 0.34 mM |
| $SrCl_2.6H_2O$ | 36.80 µM |
| $FeCl_3.6H_2O$ | 6.8 µM |
| EDTA | 15.0 µM |

EXAMPLE 5

The following general procedure can be used to isolate eicosapentaenoic and arachidonic acids from *Porphyridium cruentum*. At steady state, microalgal biomass is harvested by centrifugation and lyophilized. 500 g of lyophilized biomass is treated with 35 L of 96% ethanol with 800 g of KOH for lipid extraction and simultaneous saponification. Extraction/saponification is carried out at 60° C. for one hour, with a constant agitation in an argon atmosphere. The mixture obtained is filtered through a 160 μm filter to remove the biomass residue. The residue is washed with 10 L of ethanol and the resulting filtrate is added to the combined filtrate, and unsaponifiables are separated by extraction with hexane (5×2 L). The hydroalcoholoic phase, containing the soaps, is acidified to pH1 with $HCl:H_2O1:1$ (v/v) and the fatty acids are recovered by extraction with hexane (8×2 L). The extract is washed with water to neutral pH and the total volume is made up to 50 L. The fatty acids are concentrated by the urea inclusion compound method. The urea solvent is methanol; the urea/fatty acid ratio is 4:1 (w/w); the methanol/urea ratio is 3:1 (v/w) and the crystallization temperature is 28 ° C. The crystals obtained are washed with methanol with urea saturation for enhanced yield and are then filtered to remove the residue.

EXAMPLE 6

The following general procedure can be used to isolate lutein from *Chlorococcum citriforme* or *Muriellopsis* sp. In a typical process at steady state, microalgal biomass is harvested by centrifugation to form a microalgae paste. The microalgae paste (1 kg), tetrahydrofuran (THF, 10 L), and sodium or potassium hydroxide (250 g) in food grade ethanol (2.5 L) are homogenized at room temperature. The homogenate is steeped at an elevated pH of 12, for two hours. The pH of the mixture is monitored and automatically maintained at a pH of 12. An additional amount of sodium or potassium hydroxide (250 g) in 2.5 L of ethanol is normally needed to maintain the pH at 12. The extraction and saponification is completed in about 2 hours. The solvents are then evaporated and the residue is washed with 10 L of a 1/1 mixture of water and ethanol to remove the base and the water soluble components. The lutein crystals are collected by centrifugation, washed with ethanol (1 L), and dried under high vacuum overnight at room temperature. The lutein crystals obtained are about 70% pure and can be recrystalized from a mixture of THF (200 ml) and water (300 ml) and dried under high vacuum overnight to give lutein containing about 5% zeaxanthin in 97% purity.

All of the references cited herein are hereby incorporated in their entirety. The above is a detailed description of particular embodiments of the invention. It will be appreciated that, although specific embodiments of the invention have been described herein for purposes of illustration, various modifications may be made without departing from the spirit and scope of the invention. Accordingly, the invention is not limited except as by the appended claims. All of the embodiments disclosed and claimed herein can be made and executed without undue experimentation in light of the present disclosure.

What is claimed is:

1. A method of culturing marine species comprising the steps of:
   providing saline water from an inland saline aquifer, the saline water from said aquifer being substantially free of toxic heavy metals and other pollutants;
   providing a reservoir to contain the saline water, wherein the saline water in the reservoir has been aerated and allowed to settle to reduce the level iron, copper, manganese zinc and silver in the saline water, thereby producing clarified saline water; and
   culturing at least one marine species in a grow out containment area comprising the clarified saline water.

2. The method of claim 1 further comprising the step of:
   harvesting the at least one marine species or harvesting a useful product extracted from the at least one marine species from the saline water.

3. The method of claim 2 further comprising the step of:
   purifying said saline water for reuse.

4. The method of claim 1, wherein the inland saline aquifer is the Coconino aquifer.

5. The method of claim 4, wherein the method does not employ seawater or brine from a salt-water lake.

6. The method of claim 4, wherein the step of providing saline water comprises the steps of:
   providing higher salinity water from a first part of the aquifer; and
   providing lower salinity water from a second part of the aquifer.

7. The method of claim 6 further comprising the step of:
   adding one or more additional salts to the saline water or clarified saline water such that the salt composition of the saline water or clarified saline water, respectively, approximates the salt composition of natural seawater.

8. The method of claim 6, wherein the step of culturing at least one marine species comprises:
   culturing at least two different marine species.

9. The method of claim 8 further comprising the step of:
   adding one or more additional salts to the saline water or clarified saline water such that the salt composition of the saline water or clarified saline water, respectively, approximates the salt composition of natural seawater.

10. The method of claim 9, wherein at least one marine species is algae and at least one species is selected from the group consisting of fish, shrimp and shellfish.

11. The method of claim 4 further comprising the step of:
    adding essentially non-saline water to the saline water or clarified saline water to reduce salinity of the same.

12. The method of claim 4, wherein the step of culturing at least one marine species comprises:
    culturing at least two different marine species.

13. The method of claim 4, wherein the at least one marine species is selected from the group consisting of microalgae, macroalgae, fish, shrimp and shellfish.

14. The method of claim 4 further comprising the step of:
    adding one or more additional salts to the saline water or clarified saline water such that the salt composition of the saline water or clarified saline water, respectively, approximates the salt composition of natural seawater.

15. The method of claim 4, wherein the step of culturing further comprises the step of culturing the at least one marine species in the presence of one or more fertilizers and/or nutrients.

16. The method of claim 4, wherein the saline water or clarified saline water has a composition suitable for aquaculture of one or more marine species.

17. A system for the aquaculture of marine species, the system comprising:
    an inland saline water aquifer that provides saline water, after aeration below, having no more than the EPA acceptable levels of toxic heavy metals for drinking water;

at least one aeration tower that promotes the precipitation of undesired metals or metal ions in the saline water thereby forming clarified saline water;

at least one reservoir containing water obtained directly or indirectly from the aquifer;

at least one containment area selected from the group consisting of a pond, tank, raceway, bioreactor, photobioreactor, turbidostat, bag system and tower system, the containment area containing the clarified saline water obtained from the reservoir;

a culture of at least one marine species in the saline water in the at least one containment area; and at least one first processing system for harvesting at least a portion of the culture of the at least one marine species from the saline water thereby forming a harvested marine species mass.

18. The system of claim 17, wherein the undesired metals or metal ions comprise iron, copper, manganese zinc and silver.

19. The method of claim 17 further comprising at least one second processing system for converting the harvested marine species mass into a useful product.

20. The method of claim 19, wherein the at least one second processing system is adapted for preparing a marine plant material into a usable form.

21. The method of claim 19 further comprising at least one third processing system for extracting at least one useful product from the harvested marine species mass.

22. The method of claim 19, wherein the useful product comprises algae.

23. The system of claim 19, wherein the useful product is selected from the group consisting of a nutritional supplement, nutraceutical, bio-diesel, methanol and hydrogen fuel.

24. The method of claim 17 further comprising at least one third processing system for extracting at least one useful product from the harvested marine species mass.

25. The method of claim 24, wherein the at least one third processing system is adapted for extracting a polysaceharide, β-carotene, lutein, astaxanthin, zeaxanthin, docosahexaenoic acid, eicosapentaenoic acid, arachidonic acid, B-phycoerythrin, and/or R-phycocyanin from the useful mass.

26. The method of claim 24, wherein the at least one third processing system is adapted for processing the algae into bio-diesel, methanol or hydrogen fuel.

27. The method of claim 17, wherein the at least one first processing system is adapted for separating a solid from the water.

28. The method of claim 17, wherein the at least one first processing system is adapted for separating a marine plant from the water.

29. The method of claim 17, wherein the at least one first processing system is adapted for separating a marine animal from the water.

30. The method of claim 17 comprising at least two ponds as reservoirs.

31. The method of claim 17, wherein the at least one first processing system comprises a constant flow centrifuge or other filtration system that can concentrate a saline solution with 0.05% w/v solids to 25–50% w/v solids.

32. The method of claim 17, wherein the saline aquifer is the Coconino aquifer.

33. The method of claim 32, wherein salinity of the saline water obtained from the aquifer varies according to the depth in the aquifer from which the water was obtained.

34. The method of claim 32, wherein the saline water is obtained from the aquifer by way of one or more wells.

35. The method of claim 32, wherein the saline water after aeration has a salinity in the range of about 1 to 65 ppt.

36. The method of claim 17, wherein system is adapted to the culturing of microalgae, macroalgae, fish, shrimp, mollusk and/or shellfish.

37. The method of claim 17, wherein the system is adapted to the culturing of microalgae and the microalgae is selected from the group consisting of *Dunaliella* spp., *Haematococcus* spp., *Porphyridium* spp., *Muriellopsis* spp., *Chiorella* spp., *Chiorococcum* spp., *Tetraselmis* spp., and *Spirulina* spp.; the macroalgae is selected from the group consisting of *Porphyra* spp., *Gracilaria* spp., *Enteromorpha* spp., *Laminaria* spp., *Gelidium* spp., and *Chondrus* spp.; the fish is selected from the group consisting of Salmonidae family, Bothidae family, Pleuronectidae family, and Soleidae family; the shrimp is of the family penaeidae; and/or the shellfish is selected from the group consisting of *Crassostrea* spp., *Ostrea* spp., *Patinopecten* spp., *Argopecten* spp., and *Haliotis* spp.

38. The system of claim 17, wherein the system is a closed water-recirculating system.

39. The system of claim 17, wherein the system in an open water-replenishment system.

40. The method of claim 17, wherein the saline water or clarified saline water has a composition suitable for aquaculture of one or more marine species.

* * * * *